Patented Feb. 9, 1926.

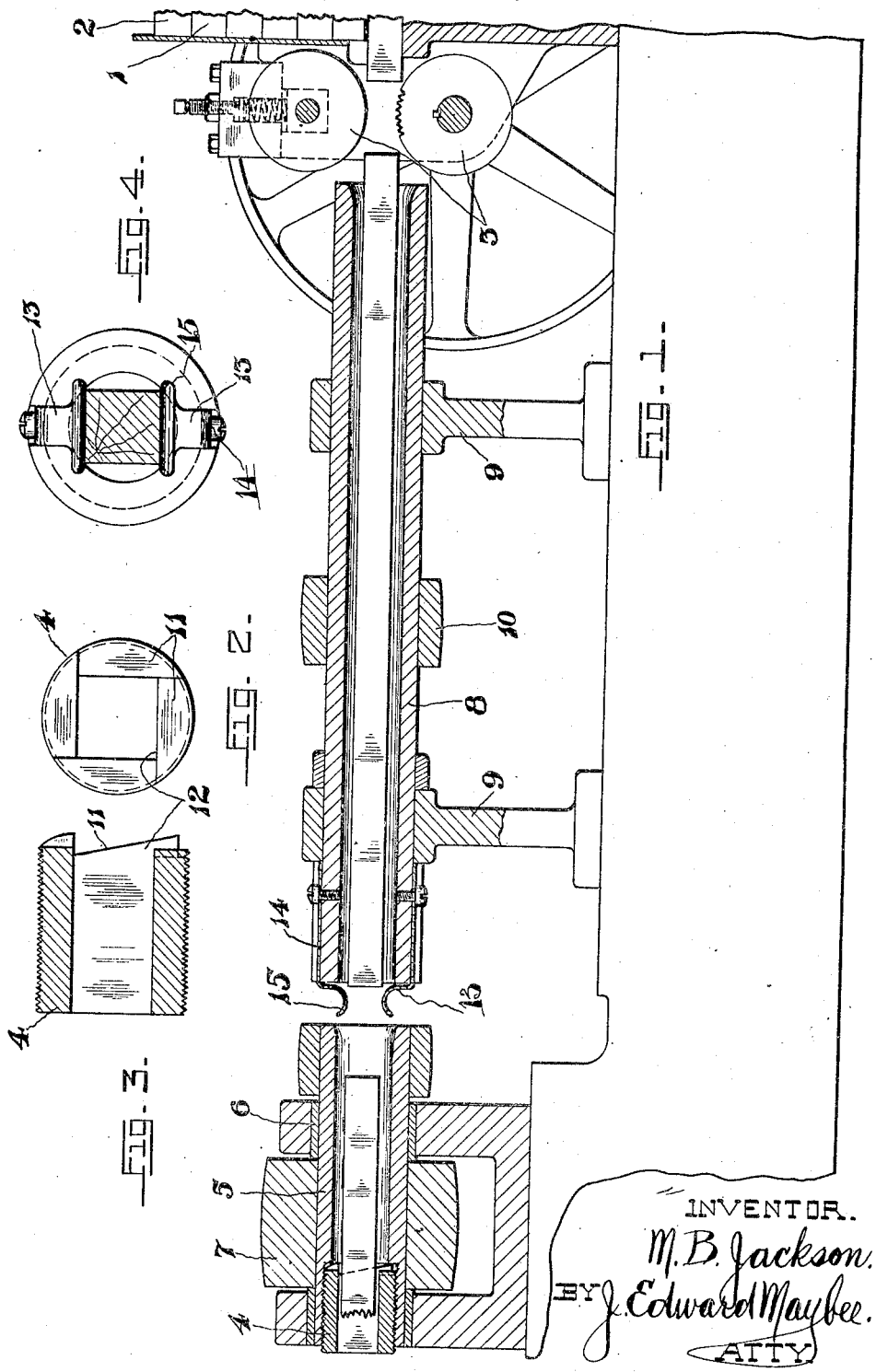

1,572,535

UNITED STATES PATENT OFFICE.

MAUNSELL B. JACKSON, OF TORONTO, ONTARIO, CANADA, ASSIGNOR OF THIRTY-THREE PER CENT TO THOMAS CAMERON BATE, THIRTY-THREE PER CENT TO EDWARD McMAHON, TWENTY-NINE PER CENT TO PHILLIP D. LYONS, AND FIVE PER CENT TO ALEXANDER PIERPONT DEROCHE, ALL OF OTTAWA, CANADA.

WOOD-TURNING MACHINE.

Application filed February 25, 1925. Serial No. 11,462.

*To all whom it may concern:*

Be it known that I, MAUNSELL B. JACKSON, of the city of Toronto, in the county of York, Province of Ontario, Canada, a subject of the King of Great Britain, have invented certain new and useful Improvements in Wood-Turning Machines, of which the following is a specification.

This invention relates to apparatus for automatically turning handles such as used for brooms, mops, hoes and the like, and more particularly to apparatus such as shown and described in my prior Patent No. 1,513,113, dated October 28, 1924. This apparatus included a magazine for square sticks, from which they were fed to a rotary driver adapted to receive and rotate the square sticks as they pass the cutter heads.

As the square sticks in my former apparatus move forward at considerable speed and, while not themselves rotating, have to enter a driver of square cross section which is rotating at a high rate of speed, it was found necessary to provide a driver of special form to enable the stick to enter the driver without damage to itself. This driver was therefore expensive to construct and liable to wear. My object therefore in the present invention is to devise apparatus which will enable me to dispense with the expensively constructed driver and substitute therefor a simpler one, less liable to become worn and which can be more cheaply replaced when necessary.

I attain my object by interposing between the feed mechanism and the rotary square driver, a rotary guide tube in which, by frictional contact with the interior of the tube, the sticks are gradually brought up to a speed of rotation approximating the speed of rotation of the driver before their ends enter the latter.

My improvements are constructed substantially as hereinafter described and illustrated in the accompanying drawings in which Fig. 1 is a side elevation, partly in section, of part of a wood turning machine constructed in accordance with my invention;

Fig. 2 an end elevation of the rotary driver;

Fig. 3 a longitudinal section of the same; and

Fig. 4 an end elevation of the rotary guide with its spring fingers.

In the drawings like numerals of reference indicate corresponding parts in the different figures.

1 is a magazine in which are placed the square sticks 2 from which the handles are to be turned. The sticks are fed forward one at a time from this magazine between a pair of feed rollers 3 driven in any suitable manner. While in practice automatic mechanism will be provided to eject the sticks from the magazine, for the purposes of the present invention it may be assumed that the sticks are ejected by hand.

4 is a rotary driver of tubular form, its bore being square in cross section, its interior diameter being but slightly greater than that of the sticks. This driver is mounted in one end of a tube 5 journalled in bearings 6, the tube extending from the driver towards the feed rolls. Between the bearings 6 a pulley 7 is keyed to the tube 5 whereby the rotary driver may be driven.

Between the rotary driver and the feed rolls a rotary guide 8 is journalled in bearings 9. Between the bearings a pulley 10 is keyed to the rotary guide whereby it may be driven. This rotary guide is of considerable length and is so positioned and proportioned that when a stick passes from between the feed rollers 3, the forward end of the stick has not reached the further end of the rotary guide tube. The rotary guide 8 is driven at substantially the same speed as the rotary driver 4.

The interior of the rotary guide tube 8 is cylindrical and its interior diameter is slightly greater than that of the diagonal of the cross section of one of the square sticks. As soon as a stick has passed from the bite of the feed rollers, it tends to rotate with the rotary guide tube owing to its frictional engagement with the interior of the tube.

As the next stick, pushed forward for engagement by the feed rollers, does not immediately follow the first, an appreciable space of time is given for the operation of the rotary guide to induce a rotary movement of the square stick approximating the rate of rotation of the rotary guide tube itself. As the following stick pushes the first forward, it enters the tube 5 which is rotating at substantially the same rate as the guide 8 and the frictional effect of both tubes is felt by the square stick, which tends to bring the rate of rotation of the stick still closer to that of the tubes.

The forward end of the stick finally reaches the mouth of the rotary driver 4, which can only receive the stick when the sides of the stick are parallel to the sides of the bore of the driver. The corners of the stick may thus strike the end of the driver in such a position that the stick cannot pass into the square bore, but as the stick always tends to lag a little behind the driver in rotation, the stick and driver will almost immediately come to a position in which it may enter the bore of the driver as it is pushed forward by the following stick. As, however, the stick must move forward while this rotary adjustment is taking place, the end of the driver facing the rotary guide is given the form of a four-toothed ratchet clutch, the inner sides of the teeth 11 coinciding with the sides of the end of the driver. The result is that if the corners of the stick contact with these inclined surfaces 11, they ride down these inclined surfaces until the sides of the stick are in exact alinement with the sides of the bore of the driver. Beyond this position the stick cannot turn as its corners have ridden down to a position to engage the shoulders 12 at the inner sides of the inclined surfaces 11.

To facilitate the sticks passing into the rotary guide 8 and the tube 5, the ends of these tubes facing the front rollers are given a bell-mouth form as shown.

To give increased friction on the sticks passing through the rotary guide so as to bring them more nearly to the same rate of rotation as the driver, I prefer to employ a pair of springs 13. These may each be formed of a thin metal plate 14 secured to the tube and provided with an inwardly extending curved end 15 adapted to engage the sides of a stick as shown particularly in Fig. 1. These springs are so positioned that they cannot engage the forward end of the stick until its rear end is clear of the feed rollers 3.

What I claim is:—

1. In a wood turning machine, the combination of means for forwardly feeding square sticks; a rotary driver of angular section interiorly; means for driving the same; a rotary tubular guide interposed between the feeding means and the driver, the interior diameter of the guide being slightly greater than the diagonals of the cross section of a stick; and driving means whereby the rotary guide may be driven to start the stick in rotation, before it reaches the driver, by the frictional action of the tube on the stick.

2. In a wood turning machine, the combination of means for forwardly feeding square sticks; a rotary driver of angular section interiorly; means for driving the same; a rotary tubular guide interposed between the feeding means and the driver, the interior diameter of the guide being slightly greater than the diagonals of the cross section of a stick; driving means whereby the rotary guide may be driven to start the stick in rotation, before it reaches the driver, by the frictional action of the tube on the stick; and spring tongues carried by the rotary guide adapted to engage the stick to assist it in attaining the same speed of rotation as the guide.

3. In a wood turning machine, the combination of means for forwardly feeding square sticks; a rotary driver of angular section interiorly; means for driving the same; a rotary tubular guide interposed between the feeding means and the driver, the interior diameter of the guide being slightly greater than the diagonals of the cross section of a stick; driving means whereby the rotary guide may be driven to start the stick in rotation, before it reaches the driver, by the frictional action of the tube on the stick; and spring tongues carried by the rotary guide adjacent its delivery end adapted to engage the stick to assist it in attaining the same speed of rotation as the guide.

4. In a wood turning machine, the combination of means for forwardly feeding square sticks; a rotary driver of square section interiorly; means for driving the same; a rotary tubular guide interposed between the feeding means and the driver, the interior diameter of the guide being slightly greater than the diagonal of the cross section of a stick; driving means whereby the rotary guide may be driven to start the stick in rotation, before it reaches the driver, by the frictional action of the tube on the stick, the end of the driver facing the rotary guide being given the form of a four toothed ratchet clutch, the inner sides of the teeth coinciding with the sides of the bore of the driver.

5. In a wood turning machine, the combination of means for forwardly feeding square sticks; a rotary driver of angular section interiorly; means for driving the same; a short tubular guide connected with the driver and facing towards the feeding means; a rotary tubular guide interposed between the feeding means and the driver, the interior diameter of the guide being slightly greater than the diagonals of the cross section of a stick; and driving means whereby the rotary guide may be driven to start the stick in rotation, before it reaches the driver, by the frictional action of the tube on the stick.

6. In a wood turning machine, the combination of means for forwardly feeding square sticks; a rotary driver of square section interiorly; means for driving the same; a short tubular guide connected with the driver and facing towards the feeding means; a rotary tubular guide interposed between the feeding means and the driver, the interior diameter of the guide being slightly greater than the diagonals of the cross section of a stick; and driving means whereby the rotary guide may be driven to start the stick in rotation, before it reaches the driver, by the frictional action of the tube on the stick, the end of the driver facing the rotary guide being given the form of a four toothed ratchet clutch, the inner sides of the teeth coinciding with the sides of the bore of the driver.

7. In a wood turning machine, the combination of means for forwardly feeding sticks of non-circular cross section; a tubular rotary driving member having its bore adapted to engage a stick to rotate the same as it passes through the driver; means for rotating the driver; a rotary tubular guide interposed between the feeding means and the driver, the interior diameter of the guide being slightly greater than the diagonals of the cross section of a stick; and driving means whereby the rotary guide may be driven to start the stick in rotation, before it reaches the driver, by the frictional action of the tube on the stick.

8. In a wood turning machine, the combination of means for forwardly feeding sticks of non-circular cross section; a tubular rotary driving member having its bore adapted to engage a stick to rotate the same as it passes through the driver; means for rotating the driver; a rotary tubular guide interposed between the feeding means and the driver, the interior diameter of the guide being slightly greater than the diagonals of the cross section of a stick; driving means whereby the rotary guide may be driven to start the stick in rotation, before it reaches the driver, by the frictional action of the tube on the stick; and spring tongues carried by the rotary guide adapted to engage the stick to assist it in attaining the same speed of rotation as the guide.

9. In a wood turning machine, the combination of means for forwardly feeding sticks of non-circular cross section; a tubular rotary driving member having its bore adapted to engage a stick to rotate the same as it passes through the driver; means for rotating the driver; a short tubular guide connected with the driver and facing towards the feeding means; a rotary tubular guide interposed between the feeding means and the driver, the interior diameter of the guide being slightly greater than the diagonals of the cross section of a stick; and driving means whereby the rotary guide may be driven to start the stick in rotation, before it reaches the driver, by the frictional action of the tube on the stick.

Signed at Toronto, Canada, this 21st day of Feb., 1925.

MAUNSELL B. JACKSON.